United States Patent
Cleveland

[11] 3,864,342
[45] Feb. 4, 1975

[54] HERBICIDAL N-SUBSTITUTED-DITHIOAMINO AND N-SUBSTITUTED- OXYTHIOAMINO TRIAZINES

[75] Inventor: James D. Cleveland, Albany, Calif.

[73] Assignee: Chevron Research Company, San Francisco, Calif.

[22] Filed: Jan. 2, 1974

[21] Appl. No.: 430,321

Related U.S. Application Data

[63] Continuation-in-part of Ser. No. 251,088, May 8, 1972.

[52] U.S. Cl. .................................. 260/249.8, 71/93
[51] Int. Cl. ............................................ C07d 55/20
[58] Field of Search ................................. 260/249.8

[56] References Cited
UNITED STATES PATENTS
2,907,763 10/1959 Hosler ............................ 260/249.8
3,138,445 6/1964 Huemer ...................................... 71/93
3,141,885 7/1964 Ross ................................. 260/249.8

*Primary Examiner*—John M. Ford
*Attorney, Agent, or Firm*—Magdeburger, G. F.; John Stoner, Jr.; Raymond Owyang

[57] ABSTRACT

Herbicidal triazine compounds of the formula

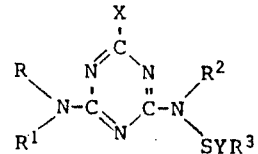

wherein X is halogen, alkylthio or alkoxy, R is hydrogen or alkyl, $R^1$ is alkyl, $R^2$ is alkyl, $R^3$ is aliphatic or carbocyclic aryl and Y is sulfur or oxygen, are produced by the reaction of an N-chlorothioamino triazine and a mercapto or hydroxy compound.

11 Claims, No Drawings

HERBICIDAL N-SUBSTITUTED-DITHIOAMINO AND N-SUBSTITUTED-OXYTHIOAMINO TRIAZINES

RELATED APPLICATION

This application is a continuation-in-part of application Ser. No. 251,088, filed May 8, 1972, the disclosure of which is incorporated herein by reference.

FIELD OF THE INVENTION

This invention relates to triazine compounds and their use as herbicides.

Herbicidal N-trichloromethylthioamino triazines are disclosed in U.S. Pat. No. 3,138,445 issued June 23, 1964, to H. Huemer. Herbicidal N-alkylthioamino triazines are disclosed in U.S. Pat. No. 3,141,885, issued July 21, 1964, to F. Ross. U.S. Pat. No. 2,907,763, issued Oct. 6, 1959, to J. F. Hosler, discloses 4,6-diamino-2-trichloromethyldithio triazine and its use as an herbicide.

DESCRIPTION OF THE INVENTION

Compounds of the present invention may be represented by the formula (I):

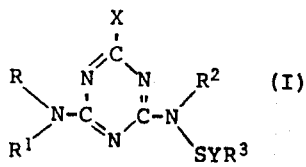

wherein X is halogen of atomic number 9 to 35 (fluorine, chlorine or bromine), alkylthio of 1 to 4 carbon atoms or alkoxy of 1 to 4 carbon atoms; R is hydrogen or alkyl of 1 to 4 carbon atoms; $R^1$ and $R^2$ individually are alkyl of 1 to 4 carbon atoms, $R^3$ is alkyl of 1 to 6 carbon atoms, alkenyl of 2 to 6 carbon atoms, cycloalkyl of 3 to 8 carbon atoms, preferably 5 to 6 carbon atoms, or carbocyclic mononuclear or binuclear aryl of 6 to 12 carbon atoms substituted with up to 2 (0 to 2) fluorine, chlorine, bromine, nitro, trifluoromethyl or alkoxy of 1 to 4 carbon atoms; and Y is sulfur or oxygen.

Representative alkylthio groups which X may represent include methylthio, ethylthio, isopropylthio, n-propylthio, and n-butylthio.

Representative alkoxy groups which X may represent include methoxy, ethoxy, propoxy, isopropoxy and n-butoxy.

Representative alkyl groups which R, $R^1$ and $R^2$ may represent include methyl, ethyl, n-propyl, isopropyl, n-butyl and t-butyl.

Representative alkyl $R^3$ groups are methyl, ethyl, isopropyl, n-butyl, isopentyl and hexyl. Representative alkenyl $R^3$ groups are vinyl, allyl, 4-pentenyl and 3-hexenyl. Representative cycloalkyl $R^3$ groups are cyclopropyl, cyclobutyl, cyclopentyl and cyclohexyl. Representative aryl $R^3$ groups include hydrocarbyl aryl groups such as phenyl, naphthyl, phenylalkyl of 7 to 10 carbon atoms such as benzyl and 3-phenylpropyl, and phenylalkyl of 7 to 10 carbon atoms such as tolyl, xylyl, 3,4,5-trimethylphenyl, and 2,4-diethylphenyl. Representative substituted-aryl $R^3$ groups include phenyl, phenylalkyl and alkylphenyl substituted with 1 to 2 fluorine, chlorine, bromine, trifluoromethyl, nitro or alkoxy of 1 to 4 carbon atoms, such as 2-fluorophenyl, 3,4-dichlorophenyl, 4-bromophenyl, 2-methyl-4-chlorophenyl, 2-trifluoromethylphenyl, 4-nitrophenyl, and 3-methoxyphenyl.

Preferably X is chlorine, methylthio, or methoxy; R is hydrogen; $R^1$ is ethyl or isopropyl; and $R^2$ is ethyl or isopropyl. More preferably $R^1$ and $R^2$ are the same. Preferably $R^3$ is alkyl or phenyl substituted with up to 2 fluorine, chlorine, bromine, trifluoromethyl, nitro, alkyl of 1 to 4 carbon atoms or alkoxy of 1 to 4 carbon atoms. More preferably $R^3$ is lower alkyl or phenyl substituted with up to 2 fluorine or chlorine.

Representative compounds of the present invention include:

2-(N-methoxythio-N-methylamino)-4-methylamino-6-chloro-1,3,5-triazine, 2-(N-allyloxythio-N-methylamino)-4-ethylamino-6-fluoro-1,3,5-triazine, 2-(N-cyclohexoxythio-N-ethylamino-4-ethylamino-6-chloro-1,3,5-triazine, 2-N-phenoxythio-N-butylamino)-4-propylamino-6-bromo-1,3,5-triazine, 2-(N-α-methylnaphthoxythio-N-ethylamino)-4-isopropylamino-6-chloro-1,3,5-triazine, 2-(N-benzyloxythio-N-isopropylamino)-4-ethylamino-6-chloro-1,3,5-triazine, 2-(N-4-nitrobenzyloxythio-N-isopropylamino)-4-isopropylamino-6-chloro-1,3,5-triazine, 2-(N-4-chlorophenyoxythio-N-isopropylamino)-4-ethylamino-6-methylthio-1,3,5-triazine, 2-(N-3-tolylthio-N-ethylamino)-4-isopropylamino-6-methylthio-1,3,5-triazine, 2-(N-ethyldithio-N-t-butylamino)-4-ethylamino-6-methylthio-1,3,5-triazine, 2-(N-allyldithio-N-methylamino)-4-methylamino-6-methylthio-1,3,5-triazine.

2-(N-cyclohexyldithio-N-ethylamino)-4-ethylamino-6-ethylthio-1,3,5-triazine, 2-(N-phenyldithio-N-methylamino)-4-propylamino-6-isopropylthio-1,3,5-triazine, 2-(N-naphthyldithio-N-isopropylamino)-4-ethylamino-6-n-butylthio-1,3,5-triazine, 2-(N-2,4-dimethylphenyldithio-N-isopropylamino)-4-ethylamino-6-methoxy-1,3,5-triazine, 2-(N-4-chlorobenzyldithio-N-ethylamino)-4-isopropylamino-6-methoxy-1,3,5-triazine, 2-(N-2-fluorophenyldithio-N--isopropylamino)-4-isopropylamino-6-methoxy-1,3,5-triazine, 2-(N-4-methoxyphenyldithio-N-t-butylamino)-4-methylamino-6-ethoxy-1,3,5-triazine, 2-(N-4-methoxyphenyldithio-N-methylamino)-4-methylamino-6-isopropoxy-1,3,5-triazine, 2-(N-3-bromophenyldithio-N-methylamino)-4-dimethylamino-6-chloro-1,3,5-triazine, 2-(N-2-trifluoromethylphenyldithio-n-methylamino)-4-diethylamino-6-methylthio-1,3,5-triazine, and 2-(N-3-bromo-4-chlorophenyldiothio-N-methylamino)-4-methylethylamino-6-methoxy-1,3,5-triazine.

The triazine compounds of the invention are prepared in accordance with the following reaction (1):

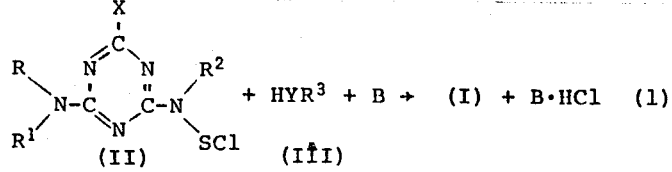

wherein R, R¹, R², R³ and Y are as defined above, and B is an acid acceptor.

The acid acceptor is an inorganic base, e.g., alkali metal hydroxide, bicarbonate or carbonate, or an organic nitrogen base having no N—H group, such as a pyridine compound or a trialkylamine. Suitable pyridine compounds are pyridine and pyridine compounds of 6 to 10 carbon atoms and of 1 to 2 alkyl groups such as 2-methylpyridine, 2-ethylpyridine, 3-methylpyridine, 3,5-dimethylpyridine, and 2-butylpyridine. Suitable trialkylamines are those wherein the alkyl group contains individually 1 to 4 carbon atoms, such as trimethylamine, triethylamine, tripropylamine and tributylamine. The preferred acid acceptors are pyridine compounds, especially pyridine.

The N-chlorothio urea reactant (II) and the mercapto or hydroxy compound (III) are employed in substantially equimolar amounts, e.g., the molar ratio of the N-chlorothio urea reactant (II) to the mercapto or hydroxy compound (III) generally varies from about 1.5:1 to 1:1.5, although molar ratios of (II) to (III) of about 1.2:1 to 1:1.2 are preferred. The molar ratios of acid acceptor to the N-chlorothio urea reactant are also substantially equimolar, e.g., the molar ratio of acid acceptor to N-chlorothio urea reactant varies from about 1.5:1 to 1:1.5, although molar ratios of acid acceptor to N-chlorothio urea reactant of about 1.2:1 to 1:1.2 are preferred.

The reaction is generally accomplished by reacting the N-chlorothio urea reactant (II) and the mercapto or hydroxy compound (III) in the presence of the acid acceptor in the liquid phase in an inert diluent. Suitable inert dileunts for the reaction include alkanes of 5 to 10 carbon atoms, such as hexane, isooctane and decane; aromatic compounds such as benzene and chlorobenzene; oxygenated hydrocarbons such as acyclic alkyl ethers, e.g., dimethoxyethane and dibutyl ether; and cycloalkyl ethers, e.g., dioxane, tetrahydrofurane and tetrahydropyran. Other suitable diluents include nitriles such as acetonitrile and propionitrile; dialkylamides such as dimethylformamide and dialkylsulfoxides such as dimethylsulfoxide. Preferred diluents are chlorinated hydrocarbons of 1 to 2 carbon atoms, such as methylene dichloride, chloroform, carbon tetrachloride and ethylene dichloride. Generally, the amount of diluent employed ranges from 1 to 50 mols per mol of N-chlorothio urea reactant.

The reaction is suitably conducted at a temperature between −20°C. and the boiling point of the diluent, although temperatures between 0° and 50°C. are preferred. The reaction is conducted at or above atmospheric pressure.

The triazine product (I) is recovered and purified by conventional procedures such as extraction, crystallization, chromatography, etc.

The N-chlorothioamino triazine reactant (II) is prepared in accordance with the following reaction (2):

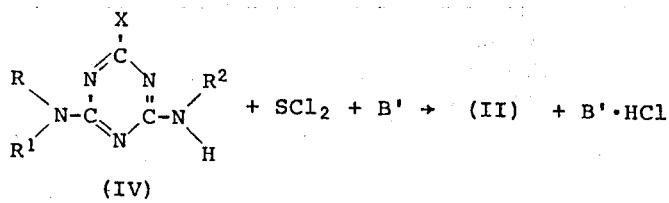

wherein R, R¹, R² and X have the same significance as previously defined and B' is an acid acceptor.

When the triazine reactant (II) has R as hydrogen and R¹ and R² as different groups, a mixture of N-chlorothioamino triazines is generally obtained.

The acid acceptor is an organic base having no N—H groups, such as a pyridine compound or a trialkylamine compound. Suitable pyridine compounds are pyridine and pyridine compounds of 6 to 10 carbon atoms and of 1 to 2 alkyl groups such as 2-methylpyridine, 2-ethylpyridine, 3-methylpyridine, 3,5-dimethylpyridine, and 2-butylpyridine. Suitable trialkylamines are those wherein the alkyl group contains individually 1 to 4 carbon atoms, such as trimethylamine, triethylamine, tripropylamine and tributylamine.

The sulfur dichloride and the triazine compound (IV) are employed in substantially equimolar amounts, e.g., the molar ratio of sulfur dichloride to the triazine compound generally varies from about 1.5:1 to 1:1.5, although molar ratios of sulfur dichloride to the triazine compound of 1.4:1 to 1.1:1 are preferred. The molar ratio of acid acceptor to sulfur dichloride is also substantially equimolar, e.g., the molar ratio of acid acceptor to sulfur dichloride varies from about 1.2:1 to 1:1.2, although molar ratios of acid acceptor to sulfur dichloride of 1:1 to 1:1.2 are preferred.

In order to produce the N-chlorothioamino triazine reactant (II) in high yield, it is essential to react the triazine compound (IV) and sulfur dichloride in the presence of a limited amount of free, uncomplexed (unreacted) acid acceptor. This is suitably accomplished by the addition of the acid acceptor to a substantially equimolar mixture of the triazine reactant and the sulfur dichloride so that the mols of free acid acceptor to the total mols of triazine reactant and N-chlorothio triazine product is less than 0.2:1, preferably less than 0.1:1 and more preferably less than 0.05:1. In other words, during the course of the reaction between the sulfur dichloride and the triazine reactants, there should be at least 5 mols of the triazine reactant and the is not complexed with hydrochloric acid. Provided that the reaction is conducted with the restricted amount of acid acceptor indicated above, the contacting of the acid acceptor with the mixture of the triazine and the sulfur dichloride can be conducted by a variety of procedures. In one modification, the acid acceptor is added in increments, e.g., dropwise, in an inert diluent, if desired, to a mixture of the triazine and sulfur dichloride in an inert diluent. In another modification, the acid acceptor is added continuously to a mixture of the triazine and sulfur dichloride in an inert diluent.

Suitable inert diluents for the reaction (2) include alkanes of 5 to 10 carbon atoms, such as hexane, isooctane and decane; aromatic compounds such as benzene and chlorobenzene; oxygenated hydrocarbons such as acyclic alkyl ethers, e.g., dimethoxyethane and dibutyl ether; and cycloalkyl ethers, e.g., dioxane, tetrahydrofuran and tetrahydropyran. Other suitable diluents include nitriles such as acetonitrile and propionitrile; dialkylamides such as dimethylformamide, and dialkylsulfoxides such as dimethylsulfoxide. Preferred diluents are chlorinated hydrocarbons of 1 to 2 carbon atoms, such as methylene dichloride, chloroform, carbon tetrachloride and ethylene dichloride. Generally, the amount of diluent employed ranges from 1 to 50 mols per mol of sulfur dichloride.

The reaction (2) is suitably conducted at a temperature between −20°C. and the boiling point of the diluent, although temperatures between 0°C. and 50°C. are preferred. The reaction is conducted at or above atmospheric pressure.

The N-chlorothio urea (II) is suitably isolated from the reaction mixture by conventional procedures such as extraction, distillation, chromatography, etc. Alternatively, a solution of the N-chlorothio urea in the reaction diluent, preferably after removal of the acid acceptor hydrochloride salt produced in the reaction, is reacted with the mercapto or hydroxy compound (III) according to reaction (1) to produce the triazine product (I) of the invention.

The preparation of the triazines of the invention is illustrated by the following examples.

EXAMPLE 1

Preparation of 2-(N-chlorothio-N-ethylamino)-4-ethylamino-6-chloro-1,3,5-triazine 2,4-Bis-(ethylamino)-6-chloro-S-triazine 10.08 g (0.05 mol) was slurried in methylene chloride. Sulfur dichloride, 5.67 g (0.055 mol) was then added to the slurry at room temperature. Pyridine (4.74 g, 0.06 mol) was then added dropwise over a period of 10 minutes to the slurry at a temperature between 25°–30°C. The reaction mixture was stirred for 30 minutes at room temperature and filtered to remove the pyridine hydrochloric product. The filtrate solution which contained the 2-(N-chlorothio-N-ethylamino)-4-ethylamino-6-chloro-1,3,5-triazine product was analyzed by nuclear magnetic spectroscopy. The methylene hydrogens of the N-chlorothio-N-ethylamino group appeared as a quartet at 3.95 δ (relative to tetramethylsilane).

EXAMPLE 2

Preparation of 2-(N-phenyldithio-N-ethylamino)-4-ethylamino-6-chloro-1,3,5-triazine A solution of about 0.05 mol of 2-(N-chlorothio-N-ethylamino)-4-ethylamino-6-chloro-1,3,5-triazine in methylene dichloride was prepared as described in Example 1. Benzenethiol (4.95 g, 0.045 mol) and pyridine (3.95 g, 0.05 mol) dissolved in 10 ml of methylene dichloride were then added dropwise to the solution of the N-chlorothioamino triazine at 0°C. over a period of 5 minutes. Ten minutes after the addition was complete, the reaction was washed with water, washed with sodium bicarbonate solution, dried over magnesium sulfate, and evaporated under reduced pressure to yield a brown semi-solid. Chromatography over silica gel (chloroform eluent) gave the triazine product as an off-white solid, m.p., 110°–111°C. Elemental analysis showed: %S, calc. 18.7, found 18.1; %Cl, calc. 10.4, found 11.1.

EXAMPLE 3

Preparation of 2-(N-methyldithio-N-ethylamino)-4-ethylamino-6-chloro-1,3,5-triazine 2,4-Bis-(ethylamino)-6-chloro-S-triazine (10.08 g, 0.05 mol) was slurried in methylene chloride. Sulfur dichloride (5.67 g, 0.055 mol) was then added to the slurry at room temperature. Pyridine (4.74 g, 0.06 mol) was then added dropwise over a period of 10 minutes at a temperature of between 25°–30°C. The reaction mixture was stirred for 30 minutes at room temperature and filtered to remove the pyridine hydrochloride.

Methyl mercaptan (2.16 g, 0.045 mol) and pyridine (3.95 g, 0.05 mol) dissolved in 10 ml of methylene chloride was then added dropwise to the filtrate solution of the N-chlorothioamino triazine at 0°C. over a period of 5 minutes. Ten minutes after the addition was complete, the reaction was washed with water, washed with sodium bicarbonate solution, dried over magnesium sulfate, and evaporated under reduced pressure to yield a brown semi-solid. Chromatography over silica gel (benzene eluent) yielded the triazine product as a white solid, m.p., 100°–102°C. Elemental analysis showed: %S, calc. 22.9, found 22.9; %Cl, calc. 12.7, found 13.0.

EXAMPLE 4

Preparation of 2-(N-methoxythio-N-ethylamino)-4-ethylamino-6-chloro-1,3,5-triazine A solution of about 0.05 mol of 2-(N-chlorothio-N-ethylamino)-4-ethylamino-6-chloro-1,3,5-triazine in methylene dichloride was prepared as described in Example 1. Methanol (1.6 g, 0.05 mol) and pyridine (3.95 g, 0.03 mol) dissolved in 10 ml of methylene chloride was added dropwise to the solution of the N-chlorothioamino triazine over a period of 5 minutes. Ten minutes after the addition was complete, the reaction mixture was washed with water, washed with sodium bicarbonate solution, dried over magnesium sulfate, and evaporated under reduced pressure to yield a brown oil. Chromatography over silica gel (benzene and 5% ethyl ether/95% benzene eluents) yielded the 2-(N-methoxythio-ethylamino)-4-ethylamino-6-chloro-1,3,5-triazine product, as a white solid, m.p. 95°–97.5°. Elemental analysis showed: %S, calc. 12.2, found 12.2, %Cl, calc. 13.5, found 13.3.

EXAMPLE 5

Herbicidal Tests

The triazine compounds of the invention are, in general, herbicidal in both pre- and post-emergent applications. For pre-emergent control of undesirable vegetation, these triazines will be applied in herbicidal quantities to the environment, e.g., soil infested with seeds and/or seedlings of such vegetation. Such application will inhibit the growth of or kill the seeds, germinating seeds and seedlings. For post-emergent applications, the triazine compounds will be applied directly to the foliage and other plant parts. Generally they are effective against weed grasses as well as broadleaved weeds. Some may be selective with respect to type of application and/or type of weed.

The triazine compounds of the present invention can be used alone as herbicides. However, it is generally desirable to apply the compounds in herbicidal compositions comprising one or more of the herbicidal compounds intimately admixed with a biologically inert carrier. The carrier may be a liquid diluent or a solid, e.g., in the form of dust powder or granules. In the herbicidal composition, the active herbicidal compounds can be from about 0.01 to 95% by weight of the entire composition.

Suitable liquid diluent carriers include water and organic solvents, e.g., hydrocarbons such as benzene, toluene, kerosene, diesel oil, fuel oil, and petroleum naphtha. Suitable solid carriers are natural clays such as kaolinite, atalpulgite, and montmorillonite. In addition, talcs, pyrophillite, diatomaceous silica, synthetic fine silicas, calcium aluminosilicate and tricalcium phosphate are suitable carriers. Organic materials such as walnut-shell flour, cottonseed hulls, wheat flour, wood flour or redwood-bark flour may also be used as solid carriers.

The herbicidal composition will also usually contain a minor amount of a surface-active agent. Such surface agents are those commonly known as wetting agents, dispersing agents and emulsifying agents, and can be anionic, cationic or nonionic in character. The herbicidal compositions may also contain other pesticides, adjuvants, stabilizers, conditioners, fillers and the like.

The amount of herbicidal compound or composition administered will vary with the particular plant part or plant growth medium which is to be contacted, the general location of application — i.e., sheltered areas such as greenhouses, as compared to exposed areas such as fields — as well as the desired type of control. Generally, for both pre- and post-emergent control, the herbicidal compounds of the invention are applied at rates of 2 to 60 kg/ha, and the preferred rate is in the range of 5 to 40 kg/ha.

Pre- and post-emergent herbicidal tests on the triazines prepared in Examples 2-4 were made using the following methods:

Pre-Emergent Test

An acetone solution of the test triazine was prepared by mixing 750 mg. triazine, 220 mg. of a nonionic surfactant and 25 ml. of acetone. This solution was added to approximately 125 ml. of water containing 156 mg. of surfactant.

Seeds of the test vegetation were planted in a pot of soil and the triazine solution was sprayed uniformly onto the soil surface at a dose of 100 micrograms per cm$^2$. The pot was watered and placed in a greenhouse. The pot was watered intermittently and was observed for seedling emergence, health of emerging seedlings, etc., for a 3-week period. At the end of this period the herbicidal effectiveness of the triazine was rated based on the physiological observations. A 0-to-100 scale was used; 0 representing no phytotoxicity, 100 representing complete kill.

Post-Emergent Test

The test triazine was formulated in the same manner as described above for the pre-emergent test. The concentration of the triazine in this formulation was 5000 ppm. This formulation was uniformly sprayed on 2 similar pots of 24-day-old plants (approximately 15 to 25 plants per pot) at a dose of 100 micrograms per cm$^2$. After the plants had dried, they were placed in a greenhouse and then watered intermittently at their bases as needed. The plants were observed periodically for phytotoxic effects and physiological and morphological responses to the treatment. After 3 weeks the herbicidal effectiveness of the triazine was rated based on these observations. A 0-to-100 scale was used; 0 representing no phytotoxicity, 100 representing complete kill.

The results of these tests appear in Table I.

TABLE 1

| Compound | Herbicidal Effectiveness — Pre/Post | | | | | |
|---|---|---|---|---|---|---|
| | O | W | C | M | P | L |
| 2-(N-phenyldithio-N-ethylamino)-4-ethylamino-6-chloro-1,3,5-triazine | 100/100 | 70/100 | 100/80 | 100/100 | 100/100 | 100/100 |
| 2-(N-methyldithio-N-methylamino)-4-ethylamino-6-chloro-1,3,5-triazine | 100/100 | 100/100 | 100/100 | 100/100 | 100/100 | 100/100 |
| 2-(N-methoxythio-N-ethylamino)-4-ethylamino-6-chloro-1,3,5-triazine | 100/100 | 100/100 | 100/50 | 100/100 | 100/100 | 100/100 |

O = Wild Oats (*Avenua Fatua*)
C = Crabgrass (*Digitaria sanguinalis*)
P = Pigweed (*Amaranthus retroflexus*)
W = Watergrass (*Echinochloa crusgalli*)
M = Mustard (*Brassica arvensis*)
L = Lambsquarter (*Chenopodium album*)

What is claimed is:

1. Triazine compound of the formula

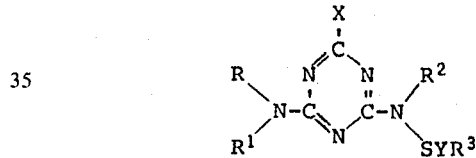

wherein X is fluorine, chlorine, bromine, alkoxy of 1 to 4 carbon atoms, or alkylthio of 1 to 4 carbon atoms, R is hydrogen or alkyl of 1 to 4 carbon atoms, R$^1$ is alkyl of 1 to 4 carbon atoms, R$^2$ is alkyl of 1 to 4 carbon atoms, R$^3$ is alkyl of 1 to 6 carbon atoms, alkenyl of 2 to 6 carbon atoms, cycloalkyl of 3 to 8 carbon atoms or carbocyclic mononuclear or binuclear aryl of 6 to 12 carbon atoms and of up to 2 fluorine, chlorine, bromine, trifluoromethyl, nitro or alkoxy of 1 to 4 carbon atoms, and Y is oxygen or sulfur.

2. Compound of claim 1 wherein X is chlorine, methoxy or methylthio.

3. Compound of claim 1 wherein R is hydrogen.

4. Compound of claim 1 wherein R$^1$ and R$^2$ are ethyl or isopropyl.

5. Compound of claim 1 wherein X is chlorine, R is hydrogen, and R$^1$ and R$^2$ are ethyl.

6. Compound of claim 1 wherein R$^3$ is alkyl and Y is sulfur.

7. 2-(N-methyldithio-N-ethylamino)-4-ethylamino-6-chloro-1,3,5-triazine, according to claim 1.

8. Compound of claim 1 wherein R$^3$ is phenyl substituted with up to 2 fluorine, chlorine, bromine, trifluoromethyl, nitro, alkyl of 1 to 4 carbon atoms or alkoxy of 1 to 4 carbon atoms.

9. Compound of claim 1 wherein R$^3$ is phenyl substituted with up to 2 fluorine or chlorine and Y is sulfur.

10. Compound of claim 1 wherein R$^2$ is alkyl and Y is oxygen.

11. 2-(N-methoxythio-N-ethylamino)-4-ethylamino-6-chloro-1,3,5-triazine, according to claim 10.

* * * * *